UNITED STATES PATENT OFFICE.

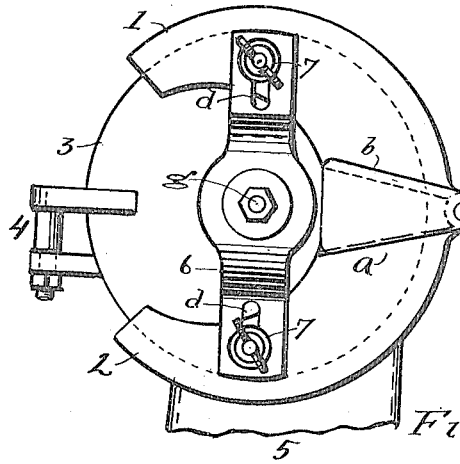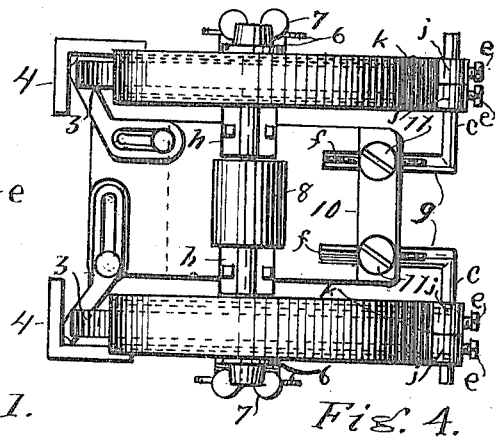

MATTHEW LUND, OF GRAND RAPIDS, MICHIGAN, ASSIGNOR TO VALLEY CITY MACHINE WORKS, OF GRAND RAPIDS, MICHIGAN, A CORPORATION OF MICHIGAN.

GUARD FOR GRINDING-MACHINES.

1,123,562.

Specification of Letters Patent.  Patented Jan. 5, 1915.

Application filed March 27, 1914.  Serial No. 827,748.

*To all whom it may concern:*

Be it known that I, MATTHEW LUND, a citizen of the United States, residing at Grand Rapids, in the county of Kent and State of Michigan, have invented certain new and useful Improvements in Guards for Grinding-Machines, of which the following is a specification.

My invention relates to improvements in dust guards for use upon emery wheels and kindred grinding machines, and its objects are: First, to provide a guard that may be readily adjusted to several sizes of wheels, or made smaller as the wheel is worn away. Second, to provide a guard with which the end of the wheel shaft is so protected as to avert the danger of the garments of the operator becoming entangled upon it, and, third, to provide a guard that may be readily attached to, or removed from the wheel frame, or adjusted to any desired position relative to the wheel. I attain these objects by the mechanism and construction shown in the accompanying drawing, in which—

Figure 1 is a side elevation of the wheel and the upper end of the frame, with the guard in position. Fig. 2 is a perspective of the guard removed from the wheel. Fig. 3 is a side elevation of the guard as applied to a smaller wheel. Fig. 4 is a top plan of a grinding machine with these guards in place, and Fig. 5 is a front view of the guard removed from the wheel.

Similar letters and numerals refer to similar parts throughout the several views.

This guard is made of two exactly similar halves, 1 and 2. These halves fit loosely upon the arm $c$ and may be firmly secured on said arm, in any desired positions, by means of the set screws $e\ e$. The guard is further strengthened and held in proper position by means of the side guards 6, which are supplied with slots $d\ d$ for the purpose of easy adjustment, and are held in place upon each of the halves, 1 and 2, by the set screws 7 7. The guard 6 is made to stand some distance out from the surface of the guards 1 and 2, and to act as a guard over the end of the shaft $g$, as indicated, so that there can be no possible danger of the garments of the operator becoming entangled with, and winding upon the nut, or the end of the shaft $g$ when operating the grinder.

The halves, 1 and 2, are each constructed with a long lip, $a$, on one side, and a short lip, $b$, on the other side, so constructed that when the two halves are placed over the grinder wheel 3 the short lip $b$ will lap just a trifle by the edge of the long lip $a$, as indicated by the dotted lines adjacent to $b$ in Fig. 1, and when the two halves are brought together for use on a smaller wheel, as in Fig. 3, these laps are increased, as there indicated. This provides a safe lap joint between the sides of the halves that prevent any dust from being forced between them.

As it is necessary to adjust the guard backward and forward as it is being adjusted to different sizes of wheels, I have provided supporting arms $9^c$, so supported in the bearings 10 that they may be moved longitudinally in said bearings, and prefer that the body, 9, be provided with a shallow groove $f$ to provide a safe footing for the ends of the set screws 11 11, as by this means it will not be necessary to screw the set screws so firmly upon the body, and thus averts the danger of marring badly, while at the same time it holds the body safely from turning in its bearing by the weight of the guard on the arm $c$.

As the motion of the wheels 3 is always in the direction of the arrow in Fig. 3 it is evident that the dust from the article being ground is, normally, thrown into the lower half of the guard, and to avert the danger of its becoming clogged in the guard, or being carried around the guard by the current of air made by the rapid rotary movement of the wheel, I provide for drawing the dust from the guard by means of any air conveying appliance, as a confined fan, by connecting with the pipe $i$ at the lower surface of the lower half of the guard, in the usual manner of collecting and transferring dust from machines of this general class.

4 4 represent rests upon which the article to be ground, is supported; 8 is the driving pulley on the shaft $g$ and $h\ h$ are the boxes that support and carry the said shaft, and 5 represents the upper end of the frame that supports the working parts of the machine.

As both halves of the guard are made exactly alike, and as each is supported on the arm $c$ independent of the other, it is evident that the back ends $j$ of both halves of the guards must be divided at $k$ so that each may have the proper bearing and support on the arm $c$, as indicated in Figs. 4 and 5. As this guard is designed to properly cover wheels of different sizes, it is evident that the back edge of a small wheel will be much farther from the back walls of the guard than will be the back edge of a large wheel, hence provision must be made to protect the sides of the wheels much farther from the back of the guard, when small wheels are used, than when large ones are used, hence I have provided for this by bringing the body of the guard back of the shaft $g$ as near to that shaft, when a large wheel is being used, as possible consistent with a full free action of all the parts, as indicated in Fig. 1, so that even with the smallest wheel possible to use with a given size of guard, and with the guard set back to the limit to bring the center of the side guard 6 concentric with the shaft $g$, there will be no possible danger of any dust escaping from the sides of the guard at this point. The side guard 6 must be so applied that its center will be exactly central with the shaft $g$, no matter whether the guard is applied to a large wheel, as in Fig. 1, or to a small wheel, as in Fig. 3, and this result is brought about, first, by reason of the form and application of the slots $d$ $d$, and partly by the adjustment of the arms or supports 9. The slots $d$ $d$ are made upon a slight incline forward from the perpendicular so that the adjustment of the supports 9 may be reduced to the least possible degree, to bring about the desired results in the adjustment of the side guard.

What I claim as new, and desire to secure by Letters Patent of the United States, is:

1. In combination with a rotary grinding machine and its wheel, a guard made of two similar halves mounted back of the wheel and divided laterally for vertical pivotal adjustment, each half provided with a long wing $a$ and a short wing $b$ arranged to lap by each other when assembled, and a side guard adjustably secured to the sides of the main guard.

2. In combination with the frame, shaft and wheels of a rotary grinding machine, a guard made in two similar halves, each half pivotally supported back of the wheel to divide laterally, covering the top, back, bottom and sides of the wheel, each half having a long offset wall and a short direct wall arranged to lap by each other when the guard is assembled, a side guard secured at its ends to the main guard, said side guard having a slot at each end and means for securing it to the main guards whereby it may be adjusted for carrying the free ends of the main guard toward, or from each other.

3. A grinding machine guard made up of two similar halves, each half arranged to cover a part of the periphery, and a part of each side of a wheel and having one side longer than the other and offset, said halves pivotally secured to an arm, at one side, and placed in pairs with edges slightly overlapping each other when assembled, so that the free ends may be moved toward, or from each other, and a side guard adjustably secured to the two halves of the main guard in a manner to permit of the main guard being opened and closed and firmly secured in place.

4. In combination with a rotary grinding machine, and its wheel, a guard made of two similar halves pivotally mounted back of the wheel and divided laterally with the meeting edges lapping by each other, for vertical adjustment of the front of the guard, and means for moving the guard backward, forward and laterally, and adjustable side guards thereon.

5. In combination with a rotary grinding machine and its wheel, a guard made with two similar halves arranged with a long wing, and a short wing on each half, arranged to lap by each other, said halves pivotally mounted back of the wheel and so arranged that the front of the guards may be opened and closed, and side guards having a slot in each end considerably inclined from the perpendicular, secured to the sides of the main guard, and means for adjusting the guard forward, backward and laterally.

Signed at Grand Rapids, Michigan, March 5th, 1914.

MATTHEW LUND.

In presence of—
ARTHUR W. SNOWDON,
I. J. CILLEY.

Copies of this patent may be obtained for five cents each, by addressing the "Commissioner of Patents, Washington, D. C."